United States Patent [19]

Amano et al.

[11] Patent Number: 5,045,736
[45] Date of Patent: Sep. 3, 1991

[54] END CAP FOR AN ACTUATOR

[75] Inventors: Hiroyuki Amano; Kouji Hirao; Shinichiro Iwasaki; Kazuhiro Matsukawa; Hiroyuki Takagi, all of Aichi, Japan

[73] Assignee: Aisin Seiki K.K., Aichi, Japan

[21] Appl. No.: 590,703

[22] Filed: Sep. 28, 1990

[30] Foreign Application Priority Data

Sep. 29, 1989 [JP] Japan .................. 1-115405[U]

[51] Int. Cl.⁵ ..................... H02K 5/136; H02K 5/132
[52] U.S. Cl. ......................................... 310/88; 310/89
[58] Field of Search ................ 310/88, 89, 87, 58; 220/DIG. 6; 417/437; 312/229; 29/523

[56] References Cited

U.S. PATENT DOCUMENTS

| | | | |
|---|---|---|---|
| 2,500,532 | 3/1950 | Fenemore | 172/285 |
| 2,824,984 | 2/1958 | Harris | 310/87 |
| 4,841,187 | 6/1989 | Hauke et al. | 310/88 |

FOREIGN PATENT DOCUMENTS 2201047 8/1988 United Kingdom ............ 310/89

Primary Examiner—Steven L. Stephan
Assistant Examiner—Edward H. To
Attorney, Agent, or Firm—Sughrue, Mion, Zinn, Macpeak & Seas

[57] ABSTRACT

An actuator end cap is provided for an actuator having a housing and a cover connected together and defining a joint therebetween. The end cap has a skirt portion disposed in overlying relation to the joint to provide a fluid-tight seal for the joint. A breather hole is formed in the side of the cover and a semi-cylindrical groove is formed on the inner surface of the skirt of the end cap. One end of the groove is disposed in communication with the breather hole in the cover and the other end of the groove is in communication with a vent hole extending outwardly through the end cap.

5 Claims, 3 Drawing Sheets 5,045,736

END CAP FOR AN ACTUATOR

BACKGROUND OF THE INVENTION

The present invention is directed to an end cap for an actuator and more specifically to an end cap having a breather passage complementary to a breathing hole in the housing of an actuator such as an electric motor or an electromagnetic valve.

An end cap is often provided on an electric motor actuator for waterproofing the actuator which is used, for example, in a cruise control system for controlling a throttle valve opening. An example of a conventional end cap is disclosed in FIG. 8.

As shown in FIG. 8, an actuator 100 includes a motor housing 101 having a cover 102. An output shaft 103 projects from the actuator 100 and the actuator 100 is fixed to the vehicle body BD by means of bolts 1e, only one of which is shown in FIG. 8. The output shaft 103 is operatively connected with a drive unit (not shown) which is accommodated in the motor housing 101. A seam or joint 104 is formed between the motor housing 101 and a cover 102. An end cap 200 is fitted on the actuator 100 over the cover 102 to seal the joint 104. The motor housing 101 and the motor cover 102 define a space 105 therein in which the drive unit is adapted to be located. A breathing hole 106 is formed in the side surface of the motor housing 101 for establishing fluid communication between the internal space 105 and the atmosphere. A breather pipe 300 having a through passage 301 is fitted in the hole 106.

When the actuator 100 is actuated, a negative pressure is created in the space 105 due to the rotation of the drive unit. If any water drops are disposed on the actuator 100, especially on the pipe 300 in the vicinity of the passage 301, the water droplets will be sucked into the actuator 100 due to the negative pressure therein. This creates a serious problem since water can severely damage the actuator drive unit.

SUMMARY OF THE INVENTION

Accordingly, it is a primary object of the present invention to provide an actuator which is capable of maintaining a breathing function while preventing the entry of water into the actuator housing.

It is another object of the present invention to provide a new and improved end cap for an actuator assembly which seals the joint between the actuator housing and cover and provides a breather passage which overcomes the drawbacks of the prior art apparatus.

To achieve the above objects, and in accordance with the principles of the invention as embodied and broadly described herein, an end cap is provided for an actuator having a housing and a cover connected together to define a joint therebetween, said end cap comprising a cup-shaped body mounted on said actuator cover in overlying relation to said joint to provide a fluid-type seal for said joint and fluid passage means formed integrally with said cup-shaped body with one end of said fluid passage means disposed in communication with a breather hole in said cover and an opposite end remote from said one end open to the atmosphere.

The foregoing and other objects, features and advantages of the invention will be apparent from the following more particular description of a preferred embodiment of the invention a illustrated in the accompanying drawings.

DETAILED DESCRIPTION OF THE INVENTION

Figure 1:
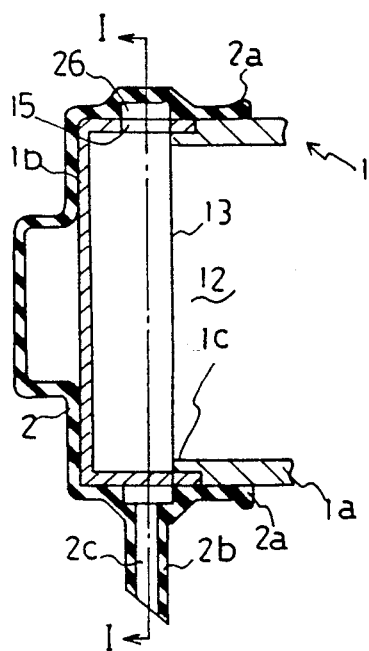
FIG. 1 shows a partial cross-sectional view of an end cap according to the present invention mounted on an actuator.

In a preferred embodiment, an actuator end cap 2 is used in conjunction with an actuator with FIG. 1 showing a partial cross-sectional view of the actuator end cap secured on the end of the actuator. The actuator 1 is comprised of a housing 1a and a cover 1b. A drive unit such as an electromagnetic actuator or an electric motor (not shown) is adapted to be mounted in the housing 1a for providing a power output when current is supplied to the actuator. The housing 1a has a cylindrical configuration with an opening 1c at one end thereof. A cover 1b having a cup-shaped configuration is fitted on the end of the housing 1a to close the opening 1c. A seam or joint 13 is established between the housing 1a and the cover 1b. The circumferential side wall of the cover 1b has a breather hole 15 formed therethrough to establish communication between the inner space 12 of the housing and the atmosphere. An actuator end cap 2 is fitted completely over the cover 1b with an annular lip or skirt 2a of the cap overlying the housing 1a to sealingly cover the seam or joint 13 between the cover and the housing. The vent pipe 2b extends from one side of the actuator cap 2 and is provided with a through passage 2c communicating the interior of the cap with the atmosphere. A circumferentially extending air passage 26 is formed on the inner side wall of the end cap with one end of the air passage 26 being disposed in communication with the passage 2c and the other end thereof being disposed substantially diametrically opposite the passage 2c.

Figure 2:
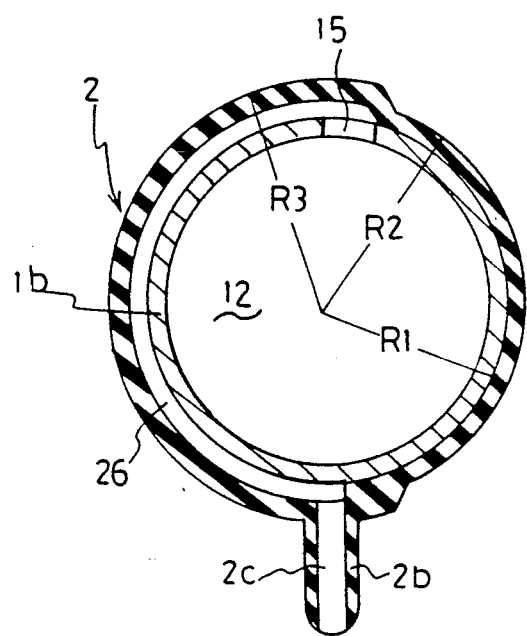
FIG. 2 is a cross-sectional view of the cap and actuator taken on the line I—I in FIG. 1.
Figure 3:
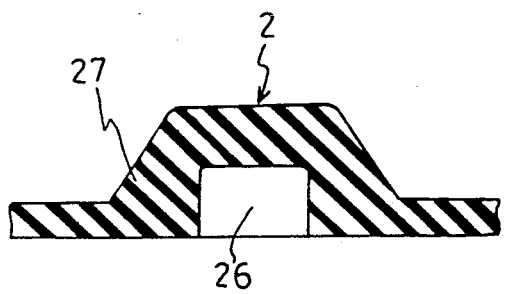
FIG. 3 is a partial enlarged sectional view showing the details of an air conduit.
Figure 4:
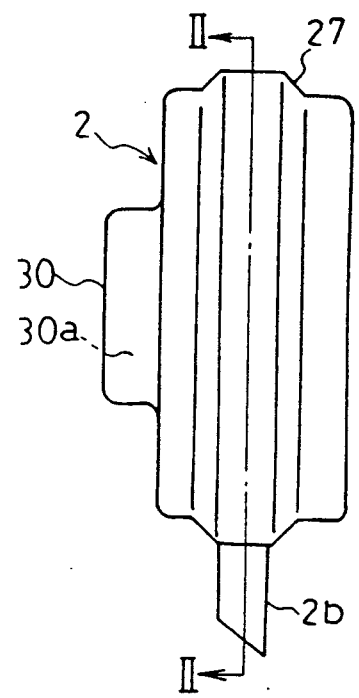
FIG. 4 is a side view of the end cap.
Figure 5:
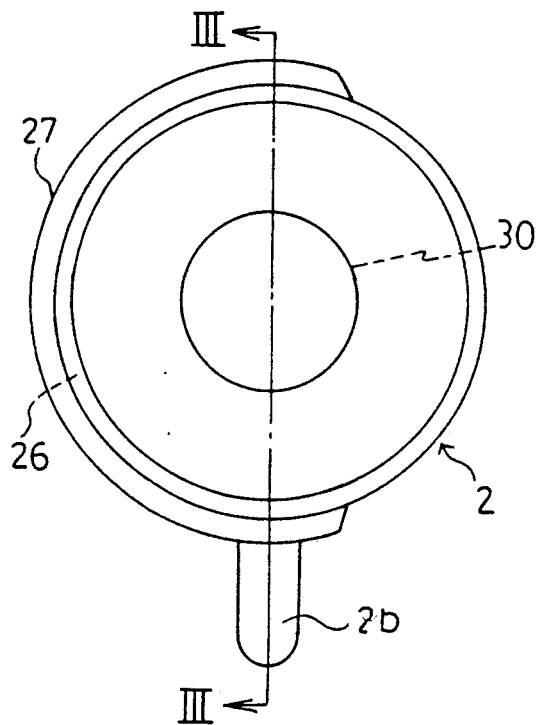
FIG. 5 is an end view of the end cap.
Figure 6:
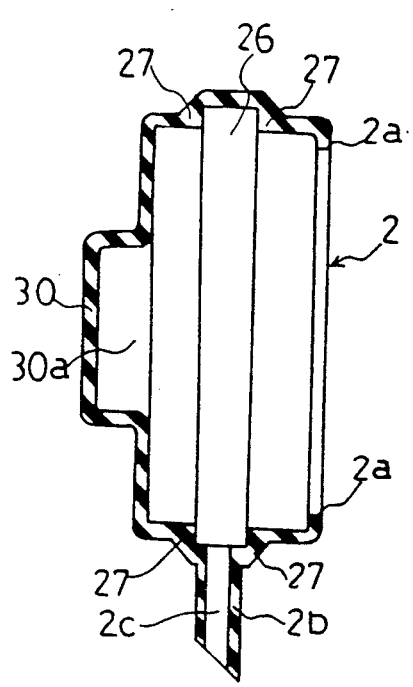
FIG. 6 is a cross-sectional view of the end cap taken on the line II—II in FIG. 4.

As best seen in FIG. 2, the external surface of the cover 1b has a radius R1 which is less than the radius R2 of the external surface of the end cap 2. In the vicinity of the air passage 26, the external surface of the end cap 2 has a radius R3 which is greater than the radius R2. The air passage 26 is in the form of a semi-cylindrical groove which has a depth equal to the difference between the radii R2 and R1. When the actuator end cap 2 is fitted over the cover 1b, the pipe 2b is located substantially diametrically opposite the breather hole 15 in the cover 1b so that the end of the air passage 26 remote from the air passage 2c will be disposed in communication with the breather hole 15. As best seen in FIG. 3, the end cap 2 is provided with a substantially thickened portion 27 surrounding the air passage 26 so as to prevent deformation of the air passage 26.

Figure 7:
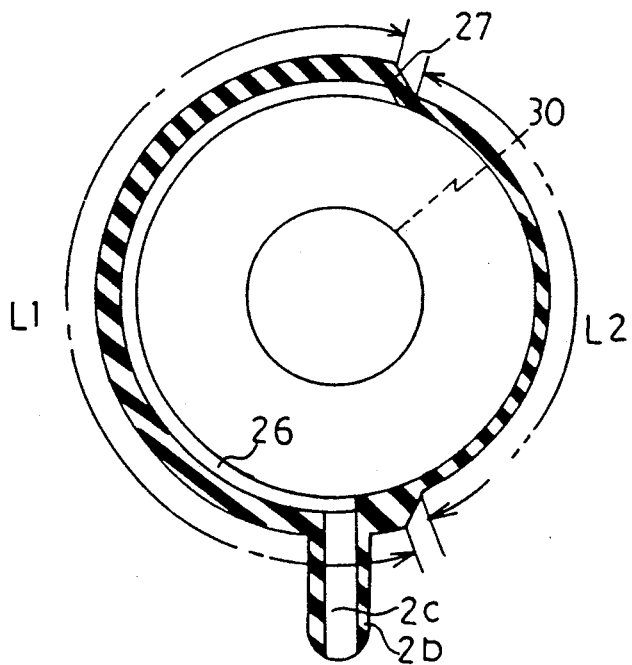
FIG. 7 is a cross-sectional view of the end cap taken on the line III—III in FIG. 5.
Figure 8:
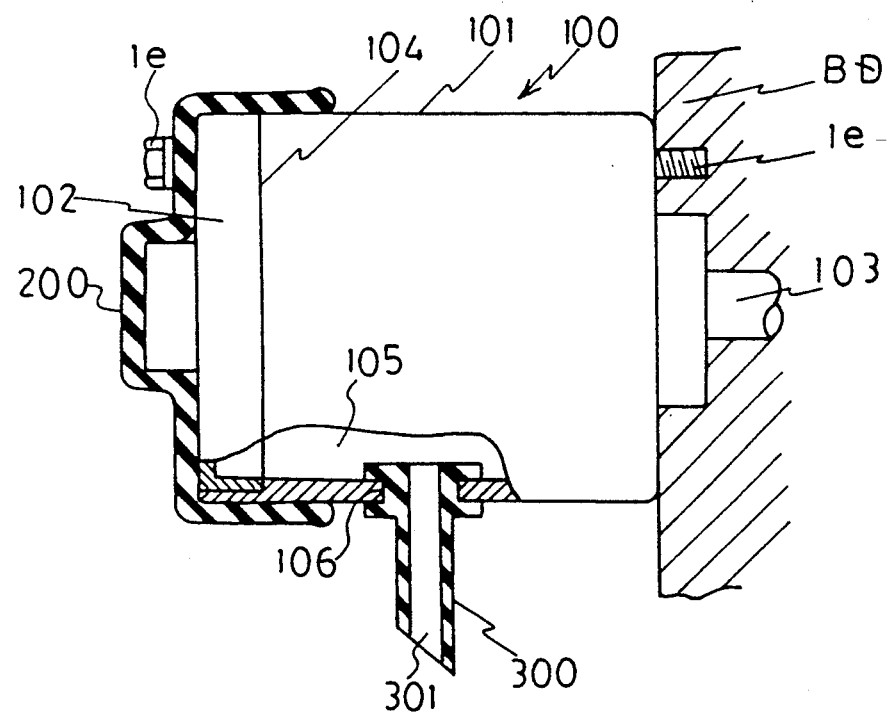
FIG. 8 is a partial cross-sectional view of a conventional end cap and actuator.

The actuator end cap 2 has a raised portion 30 on the end wall thereof defining an air space 30a. As best seen in FIG. 7, the raised portion of the side wall of the actuator end cap 2 in which the air passage 26 is located, has a circumferential length L1 which is greater than the circumferential length of the remaining portion of the side wall. This is to ensure that the air passage 26 will overlie the breather hole 15 in the cover 1b of the actuator while the pipe 2c is located diametrically opposite the hole.

Upon operation of the drive unit (not shown) within the housing 1a, a negative pressure will develop within the interior space 12. As a result of the negative pressure within the space 12, any moisture located on the outer surface of the housing tends to be drawn into the interior space through the joint 13 and the breather hole 15. Due to the presence of the actuator end cap 2 in the manner illustrated in FIGS. 1-7, the lip or skirt 2a will sealingly cover the joint 13 to prevent any entry of moisture into the interior of the housing through the joint 13. Due to the fact that the air passage 2c in the pipe 2b is located substantially diametrically opposite the breather hole 15, the length L1 of the air passage 26 is sufficient to prevent the induction of moisture into the interior space 12 of the housing 1a.

While the invention has been particularly shown and described with reference to preferred embodiments thereof, it will be understood by those in the art that the foregoing and other changes in form and details may be made therein without departing from the spirit and scope of the invention.

What is claimed is:

1. An actuator end cap for a cylindrical actuator housing having circumferentially extending joint means and a breather hole, said end cap comprising
   a cup-shaped body mounted on an end of said housing in overlying fluid tight relation to said joint means,
   air passage means in said cup-shaped body having a first end in communication with said breather hole and a second end remote from said first end and
   vent means extending through said cup-shaped body in communication with said second end.

2. An actuator end cap as set forth in claim 1, wherein said air passage means is formed on an inner surface of said cup-shaped body.

3. An actuator end cap as set forth in claim 2, wherein said air passage means is comprised of a concave recess formed in an inner circumferential surface of said cup-shaped body.

4. An actuator end cap as set forth in claim 1, wherein said cup-shaped body has a circumferential lip portion.

5. An actuator end cap as set forth in claim 3, wherein said air passage has a length extending approximately half-way about the circumference of said cup-shaped body.

* * * * *